United States Patent [19]

Bacardit

[11] Patent Number: 5,058,618
[45] Date of Patent: Oct. 22, 1991

[54] RELIEF VALVE FOR HYDRAULIC FLUID

[75] Inventor: Joan S. Bacardit, Barcelona, Spain

[73] Assignee: Bendix Espana, Barcelona, Spain

[21] Appl. No.: 627,532

[22] Filed: Dec. 14, 1990

[30] Foreign Application Priority Data

Jan. 22, 1990 [ES] Spain .................................. 9000175

[51] Int. Cl.⁵ ............................................. G05D 16/10
[52] U.S. Cl. ...................................... 137/116; 137/119
[58] Field of Search ...................... 137/116, 115, 116.3, 137/119, 117, 118

[56] References Cited

U.S. PATENT DOCUMENTS

| | | | |
|---|---|---|---|
| 3,358,705 | 12/1967 | Krechel | 137/116 |
| 3,999,568 | 12/1976 | Chapman | 137/116 |
| 4,941,502 | 7/1990 | Loos | 137/116 |

Primary Examiner—Alan Cohan
Attorney, Agent, or Firm—Larry J. Palguta; Ken C. Decker

[57] ABSTRACT

The relief valve issued for controlling the pressure of a hydraulic fluid within a first duct 30 opening into a bore 14,16 provided in a body 10, a communication between the first duct 30 and a second duct 34 connecting a primary hydraulic circuit under pressure to the bore 14,16 being provided in rest position of a valve member when the pressure within the first duct 30 is lower than a threshold determined by the preload of resilient mechanism urging the valve member in rest position, the communication being interrupted when the pressure in the first duct 30 sensibly reaches the threshold. An increase of the pressure in the first duct beyond the threshold results in providing a communication between the first duct 30 and a third duct 38 connected to a low pressure circuit.

3 Claims, 1 Drawing Sheet

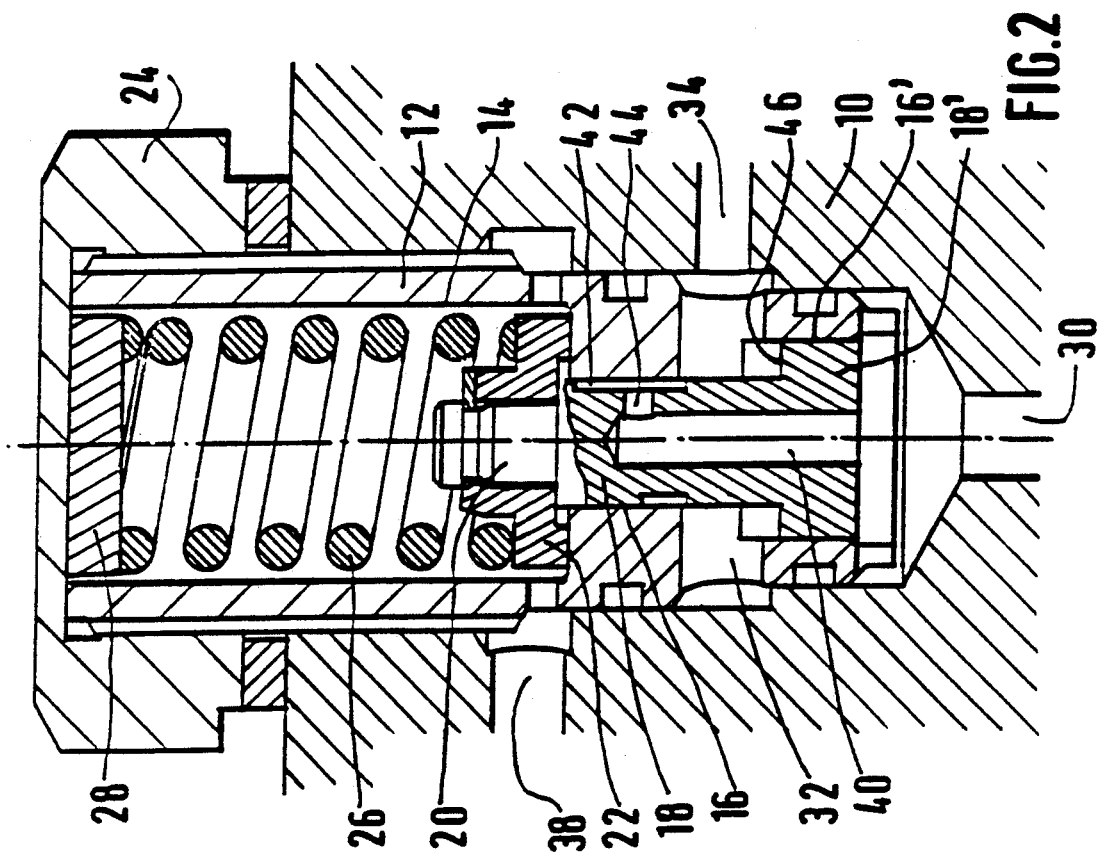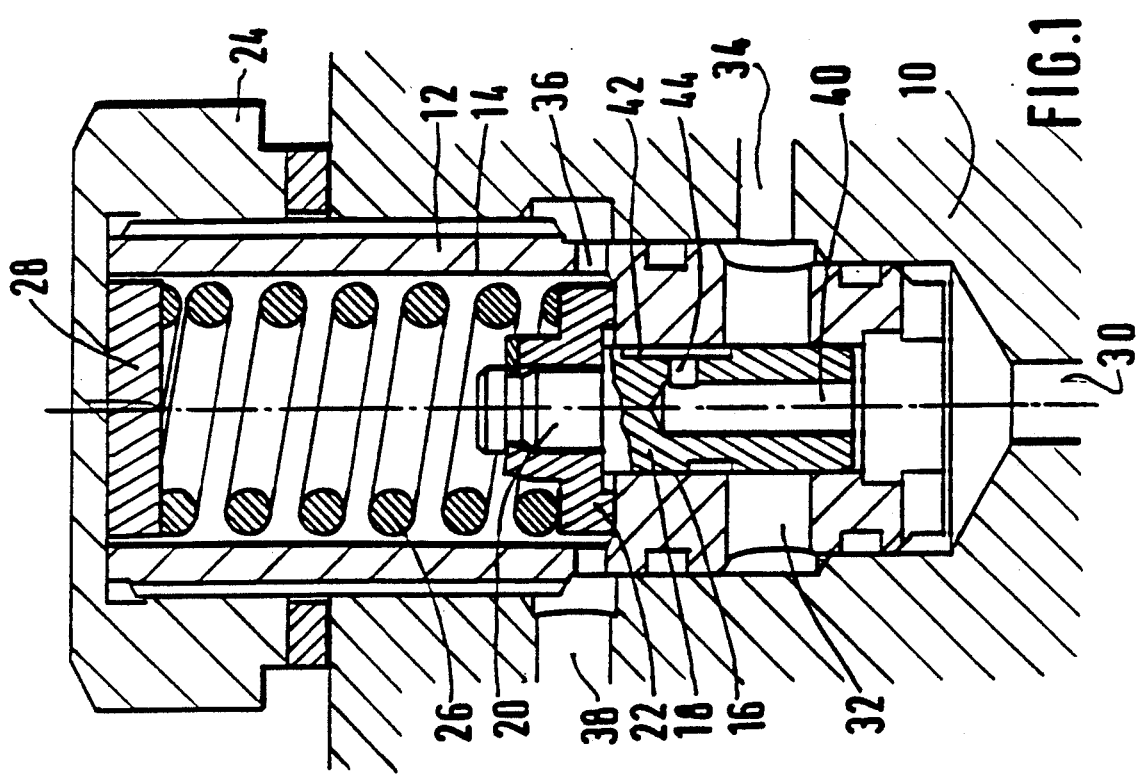

RELIEF VALVE FOR HYDRAULIC FLUID

BACKGROUND OF THE INVENTION

The present invention relates to a relief valve for hydraulic fluid, to be used to control the pressure in a duct, and whichs opens a communication between this duct and a reservoir when the pressure inside the duct exceeds a predetermined amount.

Such relief valves are well known in hydraulics, and have been given numerous designs. However, in some cases, it may be desirable that the pressure limitation occurs as a function of the pressure in another part of the hydraulic circuit. In this case, it is known to use two simple relief valves, or a single valve of a very complex design, with the result either of less reliability, or high costs, or large space required.

SUMMARY OF THE INVENTION

It is therefore an object of the present invention to provide a relief valve for hydraulic fluid which is of compact design, which has very simple parts and is easy to manufacture at low costs, and which is reliable.

Another object of the invention is to provide such a valve which operates as a limiting valve.

A further object of the invention is to provide such a valve which acts as a proportionning valve.

These objects are achieved with a relief valve for controlling the pressure of a hydraulic fluid within a first duct opening into a bore provided in a body, a communication between the first duct and a second duct connecting a primary hydraulic circuit under pressure to the bore being provided in rest position of a valve member when the pressure within the first duct is lower than a threshold determined by the preload of a resilient means urging the valve member in rest position, the communication being interrupted when the pressure in the first duct sensibly reaches the threshold.

According to the invention, an increase of the pressure in the first duct results in providing a communication between the first duct and a third duct connected to a low pressure circuit.

BRIEF DESCRIPTION OF THE DRAWINGS

Other features and characteristics will appear hereafter with the description of two preferred embodiments of the invention given as non limitative examples, and illustrated in the drawings where :

FIG. 1 is a cross-section view of a first embodiment of the invention, and

FIG. 2 is a cross-section view of a second embodiment of the invention.

In the Figures, same or analogous elements are referenced by the same numeral.

DETAILED DESCRIPTION OF THE INVENTION

The relief valve illustrated FIG. 1 comprises in a body 10 a housing 12 formed with an axial stepped bore comprising a first part of larger diameter 14 and a second part of smaller diameter 16. In the part 16 slides a piston 18, the head 20 of which enters into the bore 14 and is fixedly engaged with a stop ring 22, either by crimping as illustrated in the left half of the Figure or by a circlips as illustrated in the right half of the Figure.

The housing is closed at one end by a plug 24 and a compression spring 26 is interposed between a disc 28 resting on the plug 24 and the stop ring 22 so as to urge the piston 18 into its rest position.

The bore 16 in the housing 12 communicates with a duct 30 formed in the body 10. A radial bore 32 is formed in the housing 12, which opens in the bore 16 and which communicates with a duct 34 formed in the body 10. A radial bore 36 is formed in the housing 12, which opens in the bore 14 and which communicates with a duct 38 formed in the body 10.

The piston 18 is formed with an axial blind bore 40, opened in the direction in which the bore 16 communicates with the duct 30. Axial grooves 42 are formed externally on the piston 18, the length of which is smaller than the distance between the edge of the bore 32 and the step between the bores 14 and 16. A radial bore 44 interconnects the blind bore 40 and the grooves 42.

The relief valve thus described works as follows. The duct 34 is connected to a primary hydraulic circuit under pressure $P_1$. The duct 30 is connected to a secondary hydraulic circuit the pressure $P_2$ of which is to be controlled, and the duct 38 is connected to a low pressure reservoir.

At rest position, as illustrated, the duct 34 communicates with the duct 30 via the groove 42 and the bores 44 and 40, allowing the passage of fluid in either direction.

As long as the pressure $P_2$ is lower than a predetermined threshold, fixed by the force exerted by the spring 26 overcoming the force applied on the section of piston 18, the piston 18 does not move.

When the pressure $P_2$ reaches this predetermined value, the piston 18 moves upwards considering the FIG. 1, against the action of the spring 26. During this movement, the communication between the bores 40 and 32 is interrupted when the groove 42 is totally masked by the bore 16. No flow loss occurs if the pressure $P_2$ does not increase.

At this time, ducts 30 and 34 are actually isolated from each other : any change of pressure $P_1$ within duct 34 has no effect on $P_2$ and vice versa. If the pressure $P_2$ in the duct 30 further increases for any reason, the piston 18 will continue to move until the edge of the groove 42 passes beyond the bore 16 and opens in the bore 14. At this time, the fluid under pressure in the duct 30 is allowed to discharge in the low pressure reservoir via bores 40 and 44, the groove 42, the bores 14 and 36 and the duct 38. In this way, any increase in the pressure above the value fixed by the preload of the spring 26 is prevented.

Thus it has been provided in a simple way a relief valve acting as a limiting valve in which flow losses are limited. By means of a slight modification, it is possible to provide a relief valve acting as a proportioning valve, as illustrated in FIG. 2 for modifying the threshold as a function of the pressure P in duct 34.

The valve of FIG. 2 is broadly the same as the one previously described, except that the bore 16 is a stepped bore, and comprises a first part of smaller diameter 16 and a second part of larger diameter 16'. In this stepped bore slides the stepped piston 18 which has a part of enlarged diameter 18'. The radial bore 32 in the housing 12 opens in the axial bore 16,16' at the location of the step between the bores 16 and 16' on the rear face of the enlarged part 18' of the piston.

In the first phase of operation, the valve is in its rest position as illustrated FIG. 2, and the ducts 30 and 34 communicate.

When the pressure $P_2$ reaches the threshold determined by the preload of the spring 26 and by the pressure $P_1$ on the rear face of the enlarged part 18' of the piston, this last moves upwardly considering FIG. 2, until the groove 42 is totally masked by the bore 16 and interrupts the communication between the bores 32 and 44. The piston 18,18' is subjected, on one hand, to the force exerted by the fluid under pressure $P_2$ in the duct 30 on the surface of the part 18', and on the other hand to the force exerted by the spring 26 added to the force exerted by the fluid under pressure $P_1$ in the duct 34 on the annular surface 46 defined by the step between the parts 18 and 18' of the piston.

Thus if the pressure differential $P_2-P_1$ further increases, the piston 18,18' will further move upwards until the groove 42 opens the communication between the bores 44 and 14 and allows the return of the fluid in duct 30 to the low pressure reservoir connected to the duct 38. The pressure in the duct 30 being so released, the piston 18,18' will move downwards considering FIG. 2 and will be then submitted to the forces as described above.

It has been provided in a simple way a relief valve, acting as a proportionning valve.

Such a relief valve is particularly useful for reaction pressure limitation (steering wheel feeling) in assistance hydraulic circuits for vehicle steering gears.

What we claim is:

1. A relief valve for controlling the pressure of a hydraulic fluid within a first duct opening into a bore provided in a body, a communication between said first duct and a second duct being provided at a rest position of a valve member of the relief valve when pressure within the first duct is lower than a threshold determined by the preload of resilient means urging said valve member in the rest position, the second duct connecting a primary hydraulic circuit under pressure to said bore, said communication being interrupted when said pressure in said first duct pressure reaches said threshold, wherein an increase of said pressure in said first duct beyond said threshold results in providing a communication between said first duct and a third duct connected to a low pressure circuit, the relief valve comprising a housing received within said bore in the body and the housing having an axial stepped bore with the resilient means and valve member located within the stepped bore, said valve member being a piston formed with a blind bore communicating at one end with said first duct and at another end with an external piston groove by way of a radial piston bore, an axial length of said external piston groove being a little less than the distance between axially spaced apart edges of said second and third ducts, the piston having associated therewith a radially extending head which acts as a seat for one end of said resilient means and engages a shoulder of the stepped bore, the communication provided between said first duct and one of said second and third ducts being by means of said blind bore, radial piston bore, and external piston groove.

2. The relief valve according to claim 1, wherein said piston is a differential area stepped piston having an enlarged part receiving directly fluid pressure from said first duct, said second duct communicating fluid pressure with a rear face of said enlarged part in order to modify said threshold as a function of the difference of pressures within said first and second ducts.

3. The relief valve according to claim 1, wherein the radially extending head of the piston is a separate part attached to the piston by one of a crimp of the head and a circlip.

* * * * *